United States Patent
Mustafi et al.

(10) Patent No.: US 10,922,725 B2
(45) Date of Patent: Feb. 16, 2021

(54) AUTOMATIC RULE GENERATION FOR RECOMMENDATION ENGINE USING HYBRID MACHINE LEARNING

(71) Applicant: salesforce.com, inc., San Francisco, CA (US)

(72) Inventors: Joy Mustafi, Hyderabad (IN); Rajdeep Dua, Hyderabad (IN)

(73) Assignee: salesforce.com, inc., San francisco, CA (US)

( * ) Notice: Subject to any disclaimer, the term of this patent is extended or adjusted under 35 U.S.C. 154(b) by 104 days.

(21) Appl. No.: 16/264,148

(22) Filed: Jan. 31, 2019

(65) Prior Publication Data

US 2020/0250715 A1    Aug. 6, 2020

(51) Int. Cl.
*G06Q 30/02* (2012.01)
*G06K 9/62* (2006.01)
*G06N 20/00* (2019.01)

(52) U.S. Cl.
CPC ....... *G06Q 30/0282* (2013.01); *G06K 9/6218* (2013.01); *G06N 20/00* (2019.01)

(58) Field of Classification Search
CPC ... G06Q 30/0282; G06K 9/6218; G06N 20/00
See application file for complete search history.

(56) References Cited

U.S. PATENT DOCUMENTS

| 7,908,183 B2 | 3/2011 | Jacobi | |
| 8,555,173 B2 | 10/2013 | Kast | |
| 2008/0243637 A1 | 10/2008 | Chan | |
| 2011/0184977 A1* | 7/2011 | Du | G06Q 10/10 707/769 |
| 2012/0296701 A1* | 11/2012 | Breiter | G06Q 30/0203 705/7.33 |
| 2014/0006166 A1* | 1/2014 | Chiang | G06Q 30/0269 705/14.64 |

OTHER PUBLICATIONS

"Combining the K-means and decision tree methods to promote customer value for the automotive maintenance industry" (Yi-Hui Liang, Published in IEEE International Conference on Industrial Engineering and Engineering Management on Dec. 2009) (Year: 2009).*

(Continued)

*Primary Examiner* — James M Detweiler
(74) *Attorney, Agent, or Firm* — Butzel Long; Donald J. Lecher

(57) ABSTRACT

The system and methods of the disclosed subject matter provide a hybrid machine learning approach for recommending items that a consumer should be shown as a next best offer. The recommendation may be based on the consumer's previous behavior, other consumers' previous behavior, and the consumer's profile. The system and methods may cluster an input dataset using an unsupervised clustering engine. The dataset output from the unsupervised clustering engine may be subsequently provided to the input of a supervised machine learning engine to generate a rules-based model. The system and methods may use the rules-based model to subsequently cluster new user data and generate recommendations based on the user's assigned cluster.

22 Claims, 6 Drawing Sheets

(56) References Cited

OTHER PUBLICATIONS

Chakraborty; EC3: Combining Clustering and Classification for Ensemble Learning; arXiv: 1708.08591V1 [cs.LG] Aug. 29, 2017, 14 pages.

Personalized product recommendations; https://docs.microsoft.com/en-us/dynamics365/unified-operations/retail/personalized-product-recommendations, 5 pages.

The amazon recommendations secret to selling more online; https://rejoiner.com/resources/amazon-recommendations-secret-selling-online/, 24 pages.

* cited by examiner

FIG. 3

| | Feature 1 | Feature 2 | Item 1 | Item 2 | Item 3 | Item 4 | Item 5 | Item 6 |
|---|---|---|---|---|---|---|---|---|
| User 1 | 0.5 | 0.2 | 1 | 0 | 0 | 0 | 0 | 1 |
| User 2 | 0.2 | 0.3 | 1 | 1 | 1 | 0 | 0 | 0 |
| User 3 | 0.3 | 0.1 | 0 | 1 | 0 | 0 | 0 | 0 |
| User 4 | 0.2 | 0.45 | 0 | 0 | 0 | 0 | 0 | 0 |
| User 5 | 0.7 | 0.6 | 0 | 0 | 0 | 0 | 0 | 0 |
| User 6 | 0.5 | 0.5 | 0 | 0 | 0 | 0 | 0 | 0 |
| User 7 | 0.54 | 0.6 | 0 | 0 | 0 | 0 | 1 | 0 |
| User 8 | 0.58 | 0.3 | 0 | 0 | 0 | 0 | 1 | 0 |
| User 9 | 0.62 | 0.2 | 1 | 1 | 0 | 0 | 1 | 0 |
| User 10 | 0.66 | 0.1 | 0 | 0 | 0 | 0 | 0 | 0 |

300

| | Feature 1 | Feature 2 | Item 1 | Item 2 | Item 3 | Item 4 | Item 5 | Item 6 | Cluster |
|---|---|---|---|---|---|---|---|---|---|
| User 1 | 0.5 | 0.2 | 1 | 0 | 0 | 0 | 0 | 1 | 3 |
| User 2 | 0.2 | 0.3 | 1 | 1 | 1 | 0 | 0 | 0 | 1 |
| User 3 | 0.3 | 0.1 | 0 | 1 | 0 | 0 | 0 | 0 | 1 |
| User 4 | 0.2 | 0.45 | 0 | 0 | 0 | 0 | 0 | 0 | 2 |
| User 5 | 0.7 | 0.6 | 0 | 0 | 0 | 0 | 0 | 0 | 2 |
| User 6 | 0.5 | 0.5 | 0 | 0 | 0 | 0 | 0 | 0 | 2 |
| User 7 | 0.54 | 0.6 | 0 | 0 | 0 | 0 | 1 | 0 | 2 |
| User 8 | 0.58 | 0.3 | 0 | 0 | 0 | 0 | 1 | 0 | 3 |
| User 9 | 0.62 | 0.2 | 1 | 1 | 0 | 0 | 1 | 0 | 3 |
| User 10 | 0.66 | 0.1 | 0 | 0 | 0 | 0 | 0 | 0 | 1 |

305

AUTOMATIC RULE GENERATION FOR RECOMMENDATION ENGINE USING HYBRID MACHINE LEARNING

BACKGROUND

Product advertisements are most effective when relevant to the targeted audience. Relevance may be increased by predicting the products desired by a consumer and presenting advertisements for those predicted products only. A variety of data sources and models may be employed to create the prediction using machine learning techniques. Recommendation systems that employ content-based filtering may compare a consumer profile with a description of a candidate product to assess the likelihood of the consumer's interest. Recommendation systems may also employ collaborative filtering, where the purchasing behavior of other, similar consumers is used to create a list of candidate products. In this way, the recommendation system creates a customized advertisement for each individual consumer in a manner that maximizes its impact and leads to increased sales.

BRIEF SUMMARY

According to an embodiment of the disclosed subject matter, a method for recommending an item to a target user includes receiving input data indexed according to a plurality of users, executing an unsupervised clustering process to assign each user of the plurality of users of the input data to a cluster of a plurality of clusters and to modify the input data according to the assigned clusters. The method may include generating a rule using the modified input data by executing a supervised learning process. The method may include generating a recommendation vector associated with a plurality of items. The method may include selecting an item to be recommended to the target user from the plurality of items based on the associated recommendation vector that indicates a probability that the target user will be interested in the selected item of the plurality of items. The recommendation vector associated with the plurality of items may be calculated by determining the difference between a vector associated with each user and a vector mean associated with a center of each cluster. The plurality of users may be clustered based on each users' of the plurality of users previous interaction with one or more of the plurality of items. The plurality of users may be clustered based on one or more features of each user of the plurality of users, the features identifying a personal characteristic of each user. The selected item may be absent from the target user's previous activity. The maximum value of the recommendation vector may indicate that the target user is more likely to be interested in the selected item than any other item of the plurality of items. The recommendation vector that indicates that the user is more likely to be interested in the selected item than any other item in the plurality of items may be selected from a first and second recommendation vector based on a first and second clustering method, respectively. The supervised learning process may generate a data structure associating the input data with the modified input data. The target user may not be a user within the plurality of users. The method may additional include generating a machine learning model based on the rule and assigning the target user to a cluster using the machine learning model.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 3 shows an example clustering process according to an embodiment of the disclosed subject matter.

DETAILED DESCRIPTION

A recommendation system may predict the products that a consumer should be shown as a next best offer based on one or more of the following, including previous buying behavior, other consumers' buying behavior, and consumer profile information. Providing accurate predictions becomes increasingly difficult when little or no data is available from which to base the predictions.

Making a relevant product recommendation to the user may include filtering irrelevant products from a candidate product pool. Existing filtering approaches may include content-based filtering, collaborative filtering, and classification, each having its individual drawbacks. With content-based filtering, descriptive terms may be assigned to the potential consumers and products. The terms may be assigned manually or automatically. When terms are assigned automatically, a method may be selected to extract the terms from product descriptions. The terms should be represented such that a consumer profile may be meaningfully compared with the candidate products. A learning algorithm may be selected to analyze the consumer profile based on products the consumer has already seen and to make recommendations based on the analysis. Collaborative filtering succeeds in item-based prediction, but may utilize a large candidate product pool and non-binary feature values to work most effectively. Classification may involve labeling the datasets prior to training the model and may be less effective for this reason.

While the subsequent discussion and associated figures will describe the example embodiments in the context of a consumers and products, it should be appreciated that the concepts may apply to various other arrangements. For example, aspects and features of the disclosed subject matter may be pertinent to recommending consumer services, consumer experiences, as well as recommending job applicants, travel destinations, media content, health care, and political candidates, to name a few. Accordingly, the scope and context of embodiments disclosed herein are not limited to recommending products to consumers and may apply more broadly to any circumstance where a computer-based recommendation may be made.

Figure 1:
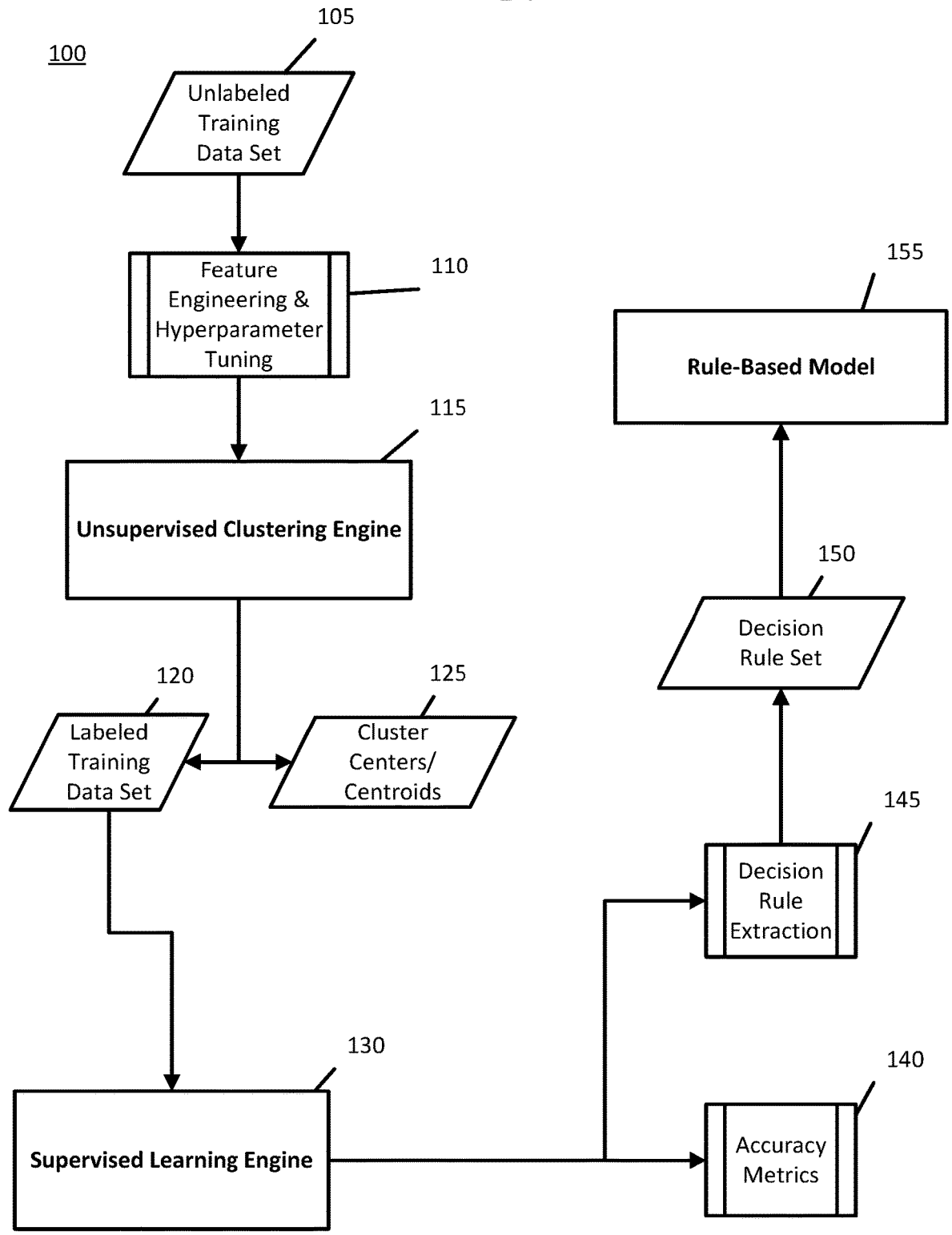
FIG. 1 is a flow diagram illustrating an example of a method for generating a model according to an embodiment of the disclosed subject matter.

FIG. 1 illustrates a flow diagram of a method 100 for generating a rule-based model 145. The specific components, data types, and arrangement of the method 100 as shown in FIG. 1 are merely illustrative, and it will be understood that other components, data types, and arrangements may also be used without departing from the scope of the present disclosure. For example, other physical arrangements may be used, and the method 100 may include various other components and data types than those shown.

The method 100 may be configured to generate a rules-based clustering model 155 that is item-based. In an item-based recommendation, items may be recommended to a user based on the consumption patterns of other users. Specifically, where a correlation may be shown between users who purchase an item A also purchase an item B, it may be presumed that a similarity may exist between items A and B. Therefore, a target user who has purchased item A should be recommended item B, where the target user has not previously purchased item B.

Figure 2:
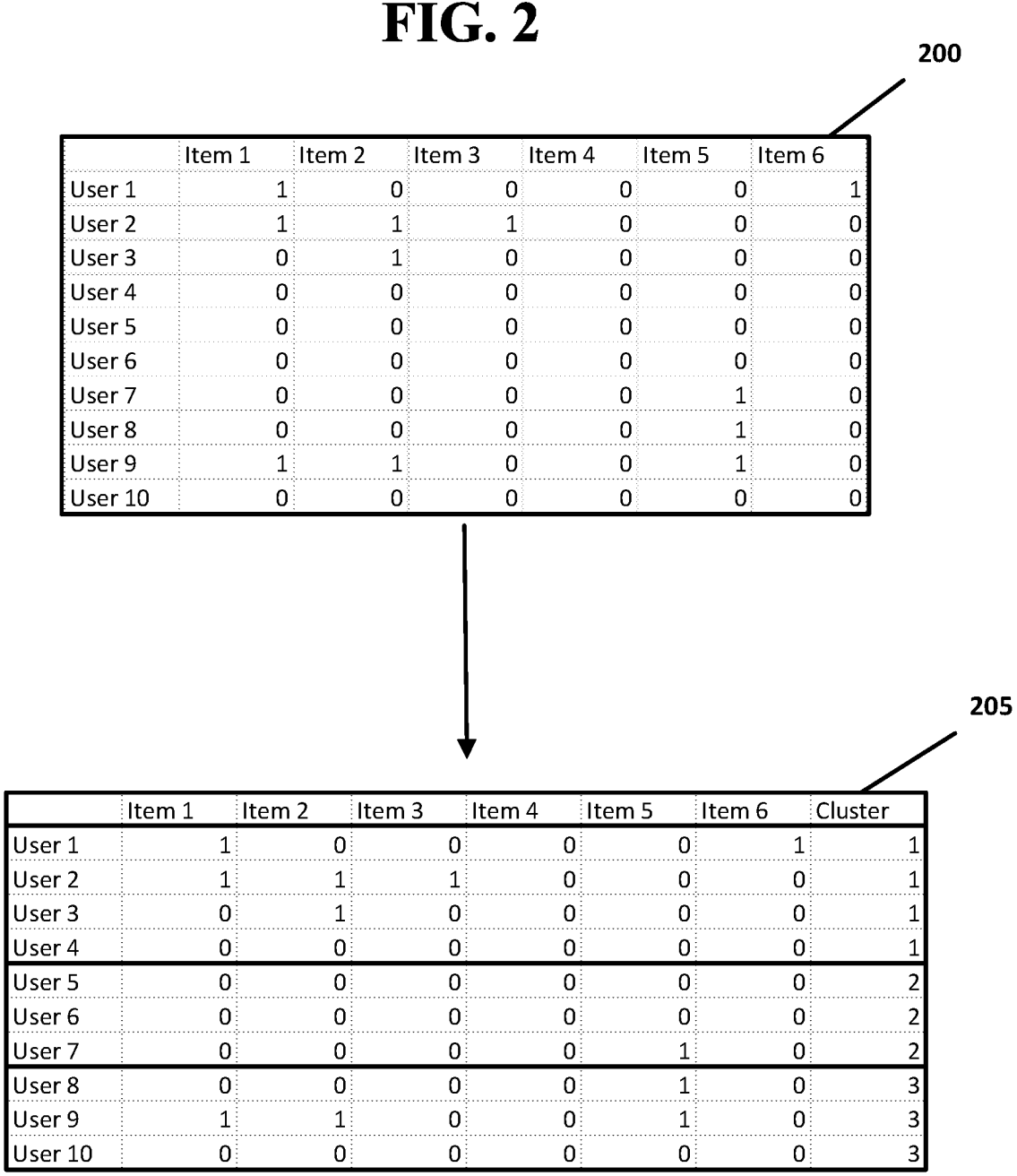
FIG. 2 shows an example clustering process according to an embodiment of the disclosed subject matter.

By way of example, FIG. 2 illustrates a first unlabeled training dataset 200 that may correspond to the unlabeled training dataset 105 of FIG. 1. The unlabeled training dataset 105 may be indexed by user. As shown in the unlabeled training dataset 200, the purchase history of each user 1 through 10 may be indicated for each of items 1 through 6. In this example, a designation of "1" indicates that the particular item was purchased, while a "0" indicates that it was not. It should be appreciated that the example data shown in unlabeled training dataset 200 may not be an exhaustive list of all possible designations and numerous alternative schemes and representations may be used. For example, in addition to "0" and "1", a "0.5" may mean that the user has not purchased the item, but saved in a virtual shopping cart, or wish list. The designated "0" and "1" may alternatively correspond to a user's rating of an item rather than whether the user purchased it and may embrace any range of numerical values, such as 0-100.

The first unlabeled training dataset 200 may be provided to unsupervised clustering engine 115 to cluster each user based on his or her past item purchases. In general, a clustering algorithm that clusters users based on an item-based recommendation may group users who have previously purchased the same, or similar items. Prior to this step, the unlabeled training dataset 200 may be subjected to feature engineering in stage 110, which may include, for example, eliminating data, separating data, combining data, bucketizing data, generating new data, or otherwise transforming the data so that it better represents the components from which a recommendation is to be based. At this same stage 110, hyperparameter tuning may also occur, where for example, the number of clusters, the number of algorithmic iterations, the number of distributions, and other applicable parameters may be selected. The clustering of users 1-10 that may be carried out via unsupervised clustering engine 115 may be accomplished using K-Means or Gaussian Mixture Models (GMM) algorithms. The number of iterations to perform when using K-Means and the number of distributions to use when using GMM may be selected during hyperparameter tuning in stage 110. Both the K-Means and GMM algorithms may perform the clustering, where the resulting labeled data of the algorithm that yields the lowest mean square error may be used in generating the subsequent recommendation. Unsupervised clustering engine 115 may also calculate the centers 125 for each of the resulting clusters 1-3, also known as centroids 125. The centroid 125 may represent the arithmetic mean of all data points grouped within the centroid's 125 cluster. Labeled training dataset 120/205 may result from the clustering process performed by unsupervised clustering engine 115, where each user may be grouped into one of clusters 1-3 as shown in FIG. 2.

Alternatively, or in addition to generating a rules-based clustering model 155 that is item-based, the method 100 may generate a rules-based clustering model 155 that is user-based. In a user-based recommendation, items may be recommended to a user based on an identified correlation between the personal features of that user and other users. If the features of user A are similar to the features of target user B, then it may be presumed that user A is similar to target user B, and items purchased by user A should be recommended to target user B, where target user B has not previously purchased those items.

By way of example, FIG. 3 illustrates a second unlabeled training dataset 300 that may correspond to the unlabeled training dataset 105 of FIG. 1. As shown in the unlabeled training dataset 300, the purchase history of each user 1 through 10 may be indicated for each of items 1 through 6. In this example, a designation of "1" indicates that the particular item was purchased, while a "0" indicates that it was not. It should be appreciated that the example data shown in unlabeled training dataset 200 may not be an exhaustive list of all possible designations and numerous alternative schemes and representations may be used. For example, in addition to "0" and "1", a "0.5" may mean that the user has not purchased the item, but saved in a virtual shopping cart, or wish list. The designated "0" and "1" may alternatively correspond to a user's rating of an item rather than whether the user purchased it and may embrace any range of values, such as 0-100. Additionally, each user may include one or more user features, shown in unlabeled training dataset 300 as "Feature 1" and "Feature 2." Any number of user features may be included within the unlabeled training dataset 300. User features may correspond to the user's demography, gender, age, or any other characteristic that may be useful in generating a recommendation. As with the numerical designations associated with each item, the designations for the user features should not be limited to those shown in FIG. 3. The user features may embrace any numerical range and correspondence between non-numeric characteristics and the associated numerical designations. For example, a user's hair color may be represented by a numeric designation between 1 and 10.

The second unlabeled training dataset 300 may be provided to unsupervised clustering engine 115 to cluster each user based on his or her respective user feature(s). In general, a clustering algorithm that clusters users based on a user-based recommendation will group users who are similar according to their respective user features. Prior to this step, and as discussed previously, the unlabeled training dataset 300 may be subjected to feature engineering in stage 110, which may include, for example, eliminating data, separating data, combining data, bucketizing data, generating new data, or otherwise transforming the data so that it better represents the components from which the recommendation is to be based. At this same stage 110, hyperparameter tuning may also occur, where for example, the number of clusters, the number of algorithmic iterations, the number of distributions, and other applicable parameters may be selected. The clustering of users 1-10 that may be carried out via unsupervised clustering engine 115 may be accomplished using K-Means or GMM algorithms. The number of iterations to perform when using K-Means and the number of distributions to use when using GMM may be selected during hyperparameter tuning in stage 110. Both the K-Means and GMM algorithms may perform the clustering, where the resulting labeled training dataset 120 of the algorithm that yields the lowest mean square error may be used in generating the subsequent recommendation. Labeled training dataset 120 may be modified to include an additional data field that specifies which cluster each user has been assigned to. Unsupervised clustering engine 115 may also calculate the cluster centers 125 for each of resulting clusters, also known as centroids 125. A centroid 125 may represent the arithmetic mean of all vectors grouped within the centroid's 125 cluster. Labeled training dataset 120/305 may result from the clustering process performed by unsupervised clustering engine 115, where the number of clusters may be set to "3" during the hyperparameter tuning stage 110, and where each user may be correspondingly grouped into one of clusters 1-3, as shown in FIG. 3.

Having clustered either or both of unlabeled training datasets 200 and 300, supervised learning engine 130 may proceed to use a decision tree algorithm or equivalent process to analyze the labeled training dataset 120 output from unsupervised clustering engine 115. In generating the decision tree from the decision tree algorithm, the supervised learning engine 130 may analyze some or all of the labeled training dataset 120, which is subsequently described in more detail. The supervised learning engine 130 may determine how each of clusters 1-3 were assigned based on one or more input user vectors forming an input dataset, such as the user vectors corresponding to each row of table 205/305. The generated decision tree may provide a simple and intelligible explanation for why each user vector of the labeled training dataset 120 was subsequently assigned to each cluster.

The decision tree generated by the supervised learning engine 130 may be checked in accuracy metrics stage 140 by generating a confusion matrix. The confusion matrix may compare the actual assigned cluster with a predicted assigned cluster to assess whether the supervised learning engine 130 became "confused" when predicting to which cluster a user vector should be assigned. The actual assigned cluster data may be based on a holdout dataset from the labeled training dataset 120; i.e., a subset of the labeled training dataset 120 that was not used in generating the decision tree. Alternatively, or in addition, the actual assigned cluster data may be based on a separate training dataset having the same schema, i.e., the same data fields as the labeled training dataset 120. The unlabeled portion of a holdout set of labeled training dataset 120 or a separate training dataset may be provided to the decision tree to predict the assigned clusters. The predicted assigned clusters may then be compared with the actual assigned clusters in the confusion matrix of accuracy metrics stage 140 to assess the accuracy of the decision tree algorithm.

Decision rule extraction stage 145 may generate a set of decision rules 150 that may streamline and simplify the decision tree generated by supervised learning engine 130. A set of decision rules 150 may result in a simpler and better performing algorithm that will, given a new user vector, accurately determine the assigned cluster with fewer computations than algorithmically traversing a decision tree. A set of decision rules may also appear clearer and more concise to a user than a decision tree. The decision rule set 150 produced by decision rule extraction stage 145 may be used to create rule-based model 155. Rule-based model may then be used to assign a new, unlabeled user vector or unlabeled dataset to one or more clusters without repeating the processing and data generation in 110-150. As a simple example, it may be determined that a user having a particular set of attributes or a specific series of ordered purchases is always assigned to one cluster. In this case, a rule may be generated which specifies that a new user matching the same criteria (i.e., having the same set of attributes or the same set of ordered purchases in this example) is assigned to the same cluster. Accordingly, when new users are encountered by the system the rule may be applied without the need to traverse the decision tree, leading to more efficient analysis and a reduction in processing time and resources than would otherwise be the case.

Figure 4:
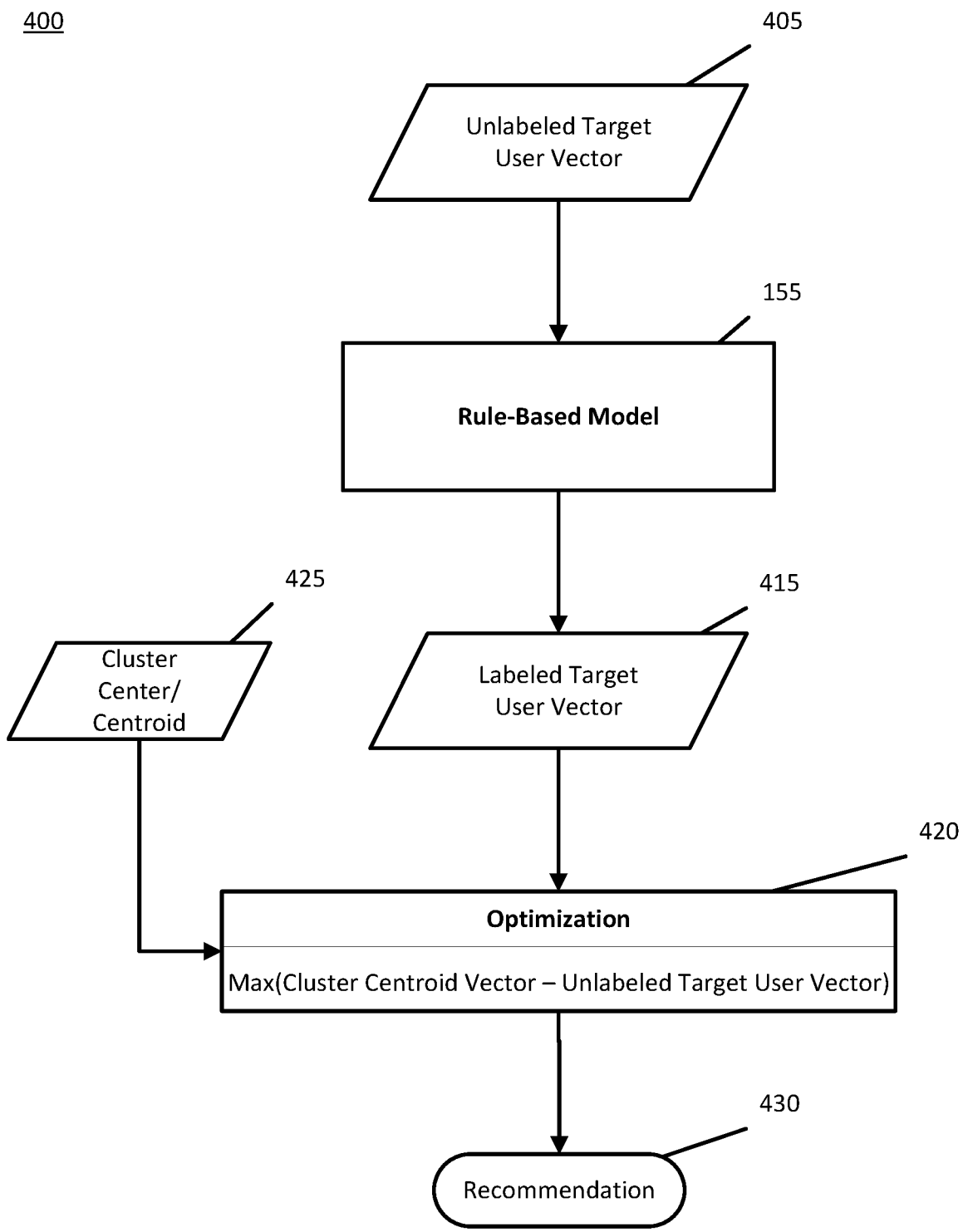
FIG. 4 is a flow diagram illustrating an example of a method for generating a recommendation according to an embodiment of the disclosed subject matter.

FIG. 4 illustrates an example flow diagram 400 of a method for generating a recommendation 430 for a new, unlabeled target user vector 405. Unlabeled target user vector 405 may be structured similarly to any of user vectors 1-10 shown in table 200 or table 300, depending on whether an item-based, user-based, or both approaches are being utilized. The rule-based model 155, which was generated in accordance with FIG. 1, may assign the unlabeled target user vector 405 to one of the clusters, thus rendering the target user vector labeled 415.

Optimization stage 420 may generate a product recommendation using formula (1):

$$\text{Recommended Product} = \text{MAX}(\text{cluster\_centroid\_vector} - \text{unlabeled\_target\_user\_vector}) \quad (1)$$

To find a recommended product for a target user, the target user's associated labeled target user vector 415 may be subtracted from the assigned cluster centroid vector 425 selected from the one or more cluster center/centroid vectors 125 computed during generation of the rule-based model 155. The maximum function (MAX) may be applied to the resulting recommendation vector to find the product in which the target user is most likely to be interested. For example, referring back to FIG. 2, the vector of User 2 may be expressed as:

| | Item 1 | Item 2 | Item 3 | Item 4 | Item 5 | Item 6 |
|---|---|---|---|---|---|---|
| User 2 | 1 | 1 | 1 | 0 | 0 | 0 |

Each "1" may indicate a previously purchased item or previous activity related to the item. The associated cluster centroid, representing the mean of all clustered users, may be expressed as:

| | Item 1 | Item 2 | Item 3 | Item 4 | Item 5 | Item 6 |
|---|---|---|---|---|---|---|
| Cluster Center (mean) | 0.9 | 0 | 0.2 | 0.2 | 0 | 0.7 |

Performing the subtraction, the resulting recommendation vector 430 may be expressed as:

| | Item 1 | Item 2 | Item 3 | Item 4 | Item 5 | Item 6 |
|---|---|---|---|---|---|---|
| Recommendation | −0.1 | −1 | −0.8 | 0.2 | 0 | 0.7 |

From the resulting recommendation vector 430, the value within each column may correspond to the probability that the target user will be interested, where a larger number indicates a greater probability of interest. One or more recommended products may be selected as the item(s) having the greatest probability values. In this example, 0.7 is the maximum probability value and corresponds to Item 6, which may be recommended to the target user. It should be appreciated that an item having a negative or zero value may not be selected, since this may indicate that the target user has already purchased the item. In the example above, User 2 has previously purchased Item 3, which is indicated within User 2's vector by a "1." The cluster center vector contains a "0.2" for Item 3, which may indicate relatively weak demand amongst other users within the same cluster. Performing the arithmetic results in a probability value of −0.8 for Item 3 within the recommendation vector, which, because it is a negative number, may eliminate it from being selected as a possible candidate item for recommendation. Should it be desirable to select a second product to recommend in addition to Item 6, Item 4 may be the next candidate for recommendation since it contains the second largest probability value. Selecting the maximum value may increase the likelihood that the target user will be interested in the item, since a greater value may indicate that a greater number of users of the same cluster have purchased the item.

It should be appreciated that for each of the labeled user vectors comprising the labeled training dataset 120 as shown in FIG. 1, a recommendation 430 may be generated by passing the labeled target user vector to optimization stage 420 in a similar manner as labeled target user vector 415. Because the labeled training dataset 120 has already been assigned to one or more clusters following the completion of method 100, it may not be necessary to apply each user vector of the dataset 120 to rule-based model 155 to prepare for processing by optimization stage 420. Instead, the individual, labeled target user vector may be input directly to optimization stage 420 to generate a recommendation 430 for that user.

While in the prior example, a "1" indicates a previously purchased item, it should be appreciated that the target user vector may include additional values to increase or decrease the likelihood that an item may be recommended. For example, a target user that has not previously purchased, but has expressed interest in an item X may result in the value of item X being set to a negative value, such as −0.5. In this way, when the recommendation calculation shown in formula (1) is performed, the resulting recommendation vector will contain a greater value for item X and may be more likely to be recommended to the target user. Similarly, a target user that has not previously purchased, but has expressed dislike for an item Y may result in the value of item Y being set to a positive value, such as 0.5. In this way, the value for item Y will be reduced and may be less likely to be recommended to the target user. It should be appreciated that a target user's expressed interest or dislike of an item may be determined in a number of ways, for example, by tracking the number of times the target user has viewed an item, whether the user has opted to "hide" the item from view, tracking the number of times the user has added the item to a virtual shopping cart, and whether the item could be considered consistent with or contrary to the user's prior purchases, income, status, beliefs, sex, and so on.

As discussed previously, an item-based, user-based, or combination approach may be used to generate a recommendation for a target user. Where a combination approach is employed, it should be appreciated that the processes and resulting data shown in FIG. 1 may occur twice to generate a first rules-based model using the item-based approach and a second rules-based model using the user-based approach. Each rules-based model may generate one or more clusters differently and may assign the respective user vectors to the stated clusters differently. Once both the item-based and user-based recommendation vectors 430 are determined based on labeled training datasets 205 and 305, respectively, the item recommendation vector 430 having the higher probability that a user may be interested, resulting from formula (1), may be selected and provided to the target user. The recommended item having the maximum value and selected from the recommendation vector 430 may be subsequently provided to the target user, any user of the system, and/or any communicatively-coupled system through any conventional means, including via print medium, electronic medium, or the like.

Although the examples provided herein are given in terms of an item to be recommended to a user such as an item for purchase, it will be apparent to one of skill in the art that the scope and content of the embodiments disclosed herein are not so limited, as previously disclosed. For example, the "item" to be recommended to a user may be a next item of interest in a multimedia system, such as a next audiovisual media item to be watched, listened to, or otherwise consumed by the user, a next task or other activity to be performed by a user, a next item of data to be reviewed by a user, or the like. In such embodiments, the item and user vectors also may have different content and forms to match the "item" under consideration, and whether a user has consumed, performed, evaluated, or otherwise interacted with the particular item.

Embodiments disclosed herein may allow for more efficient analysis and recommendation than would be achievable using conventional techniques. For example, a recommendation framework may be constructed more efficiently than comparable conventional machine learning techniques may achieve, and/or individual recommendations may be provided to a user using fewer computational resources than would be possible using conventional techniques. This is due to the use of the combined supervised and unsupervised techniques as previously disclosed, which allow for rapid development and use of the techniques disclosed herein, without a loss of generality or accuracy. Additionally, embodiments disclosed herein may overcome the associated disadvantages appearing in conventional machine learning techniques where the dataset is biased, sparsely populated, and/or the number of items within the dataset is not large.

Figure 5:
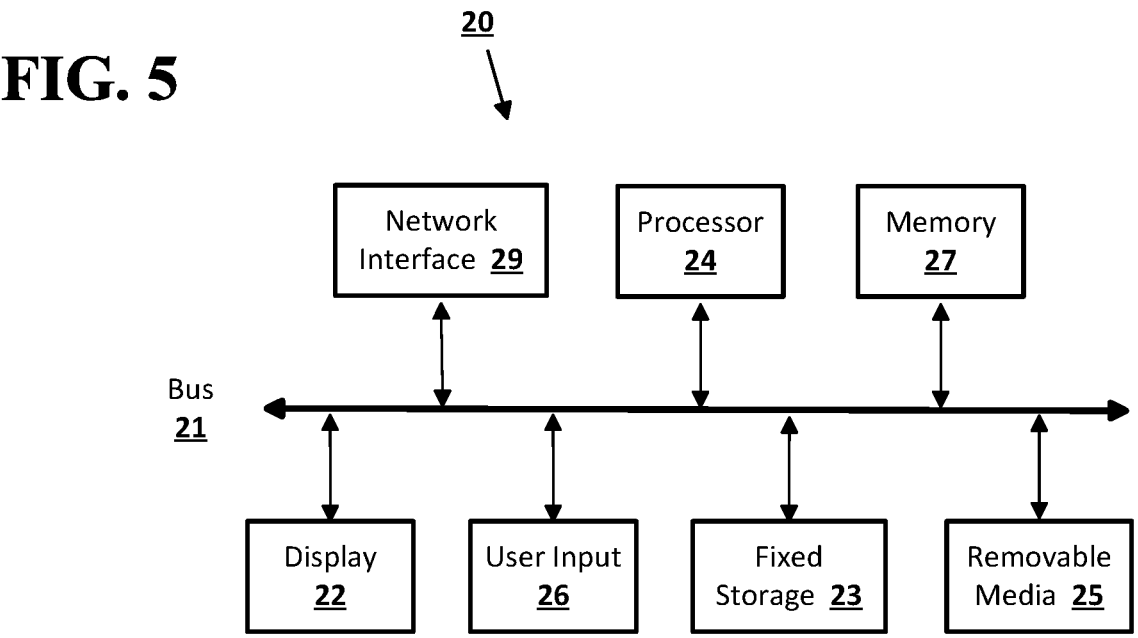
FIG. 5 shows a computing device according to an embodiment of the disclosed subject matter.

Embodiments of the presently disclosed subject matter may be implemented in and used with a variety of component and network architectures. FIG. 5 is an example computing device 20 suitable for implementing embodiments of the presently disclosed subject matter. The device 20 may be, for example, a desktop or laptop computer, or a mobile computing device such as a smart phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components, which may include RAM, ROM, and other memory, as previously noted. Typically, RAM is the main memory into which an operating system and application programs are loaded. A ROM or flash memory component can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth®, near-field, and the like. For example, the network interface 29 may allow the computer to communicate with other computers via one or more local, wide-area, or other communication networks, as will be subsequently described in further detail.

Many other devices or components (not shown) may be connected in a similar manner (e.g., document scanners, digital cameras and so on). Conversely, all of the components shown in FIG. 5 need not be present to practice the present disclosure. The components can be interconnected in different ways from that shown. The operation of a computer such as that shown in FIG. 5 is readily known in the art and is not discussed in detail in this application. Code to implement the present disclosure can be stored in computer-readable storage media such as one or more of the memory 27, fixed storage 23, removable media 25, or on a remote storage location.

Figure 6:
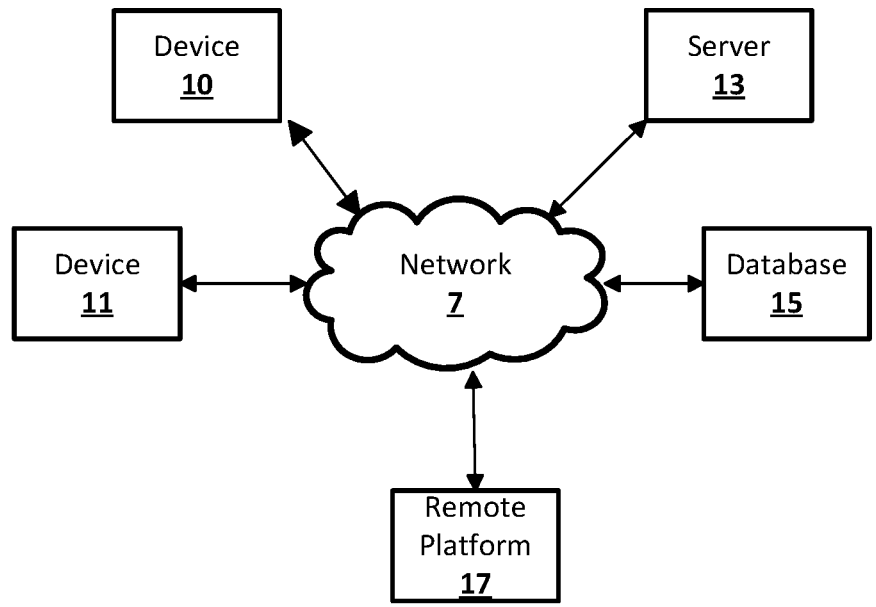
FIG. 6 shows a network configuration according to an embodiment of the disclosed subject matter.

FIG. 6 shows an example network arrangement according to an embodiment of the disclosed subject matter. One or more devices 10, 11, such as local computers, smart phones, tablet computing devices, and the like may connect to other devices via one or more networks 7. Each device may be a computing device as previously described. The network may be a local network, wide-area network, the Internet, or any other suitable communication network or networks, and may be implemented on any suitable platform including wired and/or wireless networks. The devices may communicate with one or more remote devices, such as servers 13 and/or databases 15. The remote devices may be directly accessible by the devices 10, 11, or one or more other devices may provide intermediary access such as where a server 13 provides access to resources stored in a database 15. The devices 10, 11 also may access remote platforms 17 or services provided by remote platforms 17 such as cloud computing arrangements and services. The remote platform 17 may include one or more servers 13 and/or databases 15.

Figure 7:
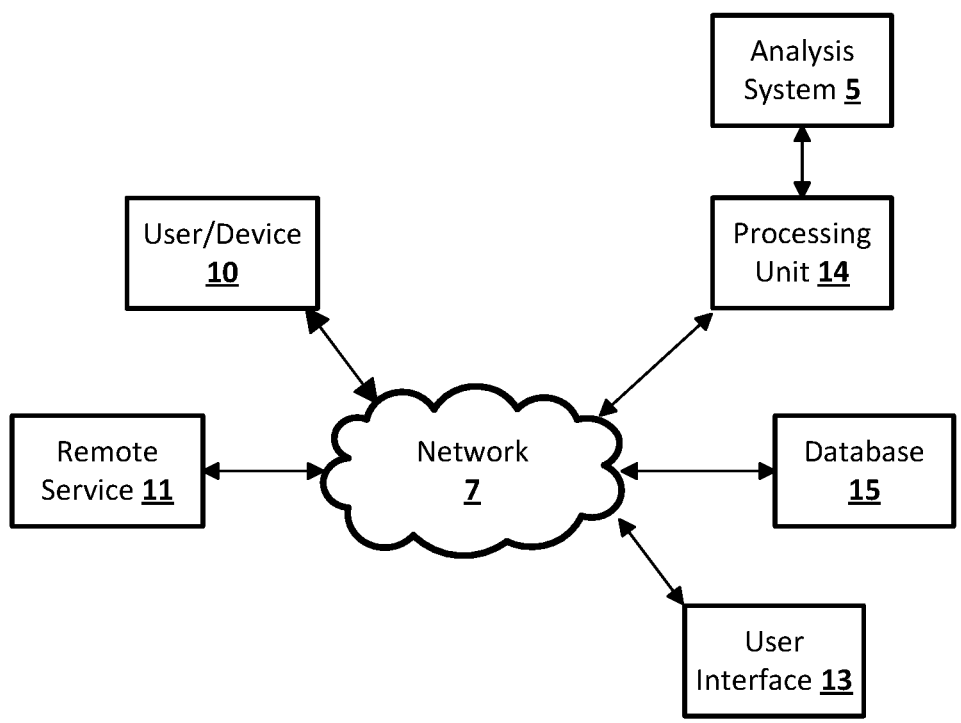
FIG. 7 shows an example network and system configuration according to an embodiment of the disclosed subject matter

FIG. 7 shows an example arrangement according to an embodiment of the disclosed subject matter. One or more devices or systems 10, 11, such as remote services or service providers 11, user devices 10 such as local computers, smart phones, tablet computing devices, and the like, may connect to other devices via one or more networks 7. The network may be a local network, wide-area network, the Internet, or any other suitable communication network or networks, and may be implemented on any suitable platform including wired and/or wireless networks. The devices 10, 11 may communicate with one or more remote computer systems, such as processing units 14, databases 15, and user interface systems 13. In some cases, the devices 10, 11 may communicate with a user-facing interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to a web browser client on a user device 10, and a computer-readable API or other interface is provided to a remote service client 11.

The user interface 13, database 15, and/or processing units 14 may be part of an integral system, or may include multiple computer systems communicating via a private network, the Internet, or any other suitable network. One or more processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative prior discussions are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method for recommending an item to a target user, comprising:
   receiving a plurality of user input data vectors indexed according to a plurality of users each of the plurality of user input data vectors comprising user personal feature data and user ordered purchase item data;
   executing, by one or more processors, an unsupervised clustering process
      to assign a first group of the plurality of user input data vectors to a user personal feature cluster based on the user personal feature data, and a second group of the plurality of user input data vectors to a user ordered purchase item cluster based on the user ordered purchase item data, and
      to modify the user input data vectors assigned to user personal feature and user ordered purchase item clusters;
   executing, by the one or more processors, a supervised learning process to generate a first rule associated with the user personal feature cluster and a second rule associated with the user ordered purchase item data cluster using the modified user input data vectors,
   wherein the first rule is configured to assign a user input data vector to the user personal feature cluster based on corresponding user personal feature data in the user input data vector, and
   wherein the second rule is configured to assign the user input data vector to the user ordered purchase item cluster based on corresponding user ordered purchase item data in the user input data vector;
   receiving, by the one or more processors, a target user vector corresponding to the target user, the target user vector comprising target user personal feature data and target user ordered purchase item data;
   assigning, by the one or more processors, the target user vector to the user personal feature cluster based on the first rule and the target user personal feature data, and to the user ordered purchase item cluster based on the second rule and the target user ordered purchase item data;
   generating, by the one or more processors, a target user personal feature vector associated with a plurality of items based on subtracting the target user vector from a user personal feature cluster centroid vector corresponding to the user personal feature cluster to which the target user vector was assigned, the target user personal feature vector comprising target user interest probability values for each of the plurality of items;
   generating, by the one or more processors, a target user ordered purchase item vector associated with the plurality of items based on subtracting the target user vector from a user purchases cluster centroid vector corresponding to the user ordered purchase item cluster to which the target user vector was assigned, the target user ordered purchase item vector comprising target user interest probability values for each of the plurality of items;
   selecting, by the one or more processors, a target user interest probability value from among one of the target user personal feature vector and the target user ordered purchase item vector based on a comparison between the target user interest probability values; and
   recommending, by the one or more processors, the item from the plurality of items to the target user, the item corresponding to the selected target user interest probability value.

2. The method of claim 1, wherein the recommended item is absent from the target user ordered purchase item data.

3. The method of claim 1, wherein the selected target user interest probability value indicates a greatest probability that the target user will be interested in the recommended item from the plurality of items.

4. The method of claim 1, wherein the target user is not a user of the plurality of users.

5. The method of claim 1, further comprising:
   generating a machine learning model based on the first and second rules and assigning the target user vector to the user personal feature cluster and the user ordered purchase item cluster using the machine learning model.

6. The method of claim 1, wherein
   the user personal feature cluster centroid vector comprises an arithmetic mean of all vectors grouped within the user personal feature cluster, and
   wherein the user ordered purchase item cluster centroid vector comprises an arithmetic mean of all vectors grouped within the user ordered purchase item cluster.

7. The method of claim 1, wherein the first rule correlates target user personal feature data to the user personal feature cluster, and
   wherein the second rule correlates target user ordered purchase cluster.

8. The method of claim 1, wherein the user personal feature data comprises at least one of a demography of a user, a gender of a user, or an age of a user.

9. A non-transitory computer-readable media comprising instructions operable, when executed by one or more computing systems, to:
   receive a plurality of user input data vectors indexed according to a plurality of users, each of the plurality of user input data vectors comprising user personal feature data and user ordered purchase item data;
   execute an unsupervised clustering process
      to assign a first group of the plurality of user input data vectors to a user personal feature cluster based on the user personal feature data, and
      to assign a second group of the plurality of user input data vectors users to a user ordered purchase item cluster based on the user ordered purchase data, and
      to modify the user input data vectors assigned to the user personal feature and user ordered purchase item clusters;
   execute a supervised learning process to generate a first rule associated with the user personal feature cluster and a second rule associated with the user ordered purchase item cluster using the modified user input data vector,
  wherein the first rule is configured to assign a user input data vector to the user personal feature cluster based on corresponding user personal feature data in the user input data vector, and
  wherein the second rule is configured to assign the user input data vector to the user ordered purchase item cluster based on corresponding user ordered purchase item data in the user input data vector;
receive a target user vector corresponding to the target user, the target user vector comprising target user personal feature data and target user ordered purchase item data;
assign the target user vector to the user personal feature cluster based on the first rule and the target user personal feature data, and to the user ordered purchase item cluster based on the second rule and the target user ordered purchase item data;
generate a target user personal feature vector associated with a plurality of items based on subtracting the target user vector from a user personal feature cluster centroid vector corresponding to the user personal feature cluster to which the target user vector was assigned, the target user personal feature vector comprising target user interest probability values for each of the plurality of items;
generate a target user ordered purchase item vector associated with the plurality of items based on subtracting the target user vector from a user purchases cluster centroid vector corresponding to the user ordered purchase item cluster to which the target user vector was assigned, the target user ordered purchase item vector comprising target user interest probability values for each of the plurality of items;
select a target user interest probability value from among one of the target user personal feature vector and the target user ordered purchase item vector based on a comparison between the target user interest probability values; and
recommend the item from the plurality of items to the target user, the item corresponding to the selected target user interest probability value.

10. The media of claim 9, wherein the recommended item is absent from the target user ordered purchase item data.

11. The media of claim 9, wherein the selected target user interest probability value indicates a greatest probability that the target user will be interested in the recommended item from the plurality of items.

12. The media of claim 9, wherein the target user is not a user of the plurality of users.

13. The media of claim 9, further comprising instructions operable, when executed by one or more computing systems, to:
  generate a machine learning model based on the first and second rules and assigning the target user vector to the user personal feature cluster and the user ordered purchase item cluster using the machine learning model.

14. The non-transitory computer-readable media of claim 9, wherein
  the user personal feature cluster centroid vector comprises an arithmetic mean of all vectors grouped within the user personal feature cluster, and
  wherein the user ordered purchase item cluster centroid vector comprises an arithmetic mean of all vectors grouped within the user ordered purchase item cluster.

15. The non-transitory computer-readable media of claim 9, wherein the first rule correlates target user personal feature data to the user personal feature data of the user input data vectors, and
  wherein the second rule correlates target user ordered purchase data to the user ordered purchase item data of the user input data vectors.

16. A system comprising:
a data store storing item data for a plurality of items and user activity data for a plurality of users; and
one or more processors configured to:
  receive a plurality of user input data vectors indexed according to a plurality of users, each of the plurality of user input data vectors comprising user personal feature data and user ordered purchase item data;
  execute an unsupervised clustering process
    to assign a first group of the plurality of user input data vectors to a user personal feature cluster based on the user personal feature data, and
    to assign a second group of the plurality of user input data vectors to a user ordered purchase item cluster based on the user ordered purchase item data, and
    to modify the user input data vectors assigned to user personal feature and user ordered purchase item clusters;
  execute a supervised learning process to generate a first rule associated with the user personal feature cluster and a second rule associated with the user ordered purchase item data cluster using the modified user input data vectors,
    wherein the first rule is configured to assign a user input data vector to the user personal feature cluster based on corresponding user personal feature data in the user input data vector, and
    wherein the second rule is configured to assign the user input data vector to the user ordered purchase item cluster based on corresponding user ordered purchase item data in the user input data vector;
  receive a target user vector corresponding to the target user, the target user vector comprising target user personal feature data and target user ordered purchase item data;
  assign the target user vector to the user personal feature cluster based on the first rule and the target user personal feature data, and to the user ordered purchase item cluster based on the second rule and the target user ordered purchase item data;
  generate a target user personal feature vector associated with a plurality of items based on subtracting the target user vector from a user personal feature cluster centroid vector corresponding to the user personal feature cluster to which the target user vector was assigned, the target user personal feature vector comprising target user interest probability values for each of the plurality of items;
  generate a target user ordered purchase item vector associated with the plurality of items based on subtracting the target user vector from a user purchases cluster centroid vector corresponding to the user ordered purchase item cluster to which the target user vector was assigned, the target user ordered purchase item vector comprising target user interest probability values for each of the plurality of items;

select a target user interest probability value from among one of the target user personal feature vector and the target user ordered purchase item vector based on a comparison between the target user interest probability values; and recommend the item from the plurality of items to the target user, the item corresponding to the selected target user interest probability value.

17. The system of claim 16, wherein the recommended item is absent from the target user ordered purchase item data.

18. The system of claim 16, wherein the selected target user interest probability value indicates a greatest probability that the target user will be interested in the recommended item from the plurality of items.

19. The system of claim 16, wherein the target user is not a user of the plurality of users.

20. The system of claim 16, further comprising:
the one or more processors further configured to:
generating a machine learning model based on the first and second rules and assigning the target user vector to the user personal feature cluster and the user ordered purchase item cluster using the machine learning model.

21. The system of claim 16, wherein
the user personal feature cluster centroid vector comprises an arithmetic mean of all vectors grouped within the user personal feature cluster, and
wherein the user ordered purchase item cluster centroid vector comprises an arithmetic mean of all vectors grouped within the user ordered purchase item cluster.

22. The system of claim 16, wherein the first rule correlates target user personal feature data to the user personal feature data of the user input data vectors, and
wherein the second rule correlates target user ordered purchase data to the user ordered purchase item data of the user input data vectors.

* * * * *